K. MASTELE.
BELT AND BELT FASTENER.
APPLICATION FILED FEB. 26, 1908.
899,831.
Patented Sept. 29, 1908.
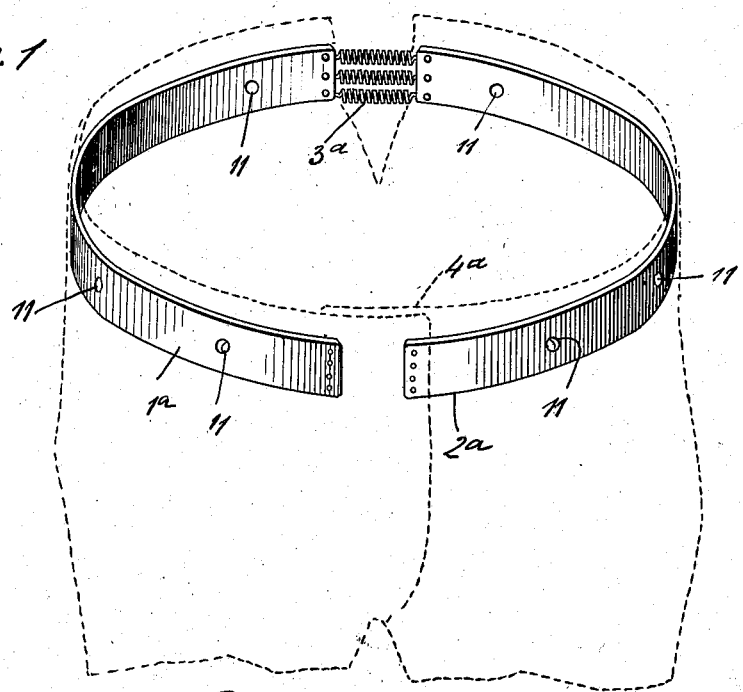
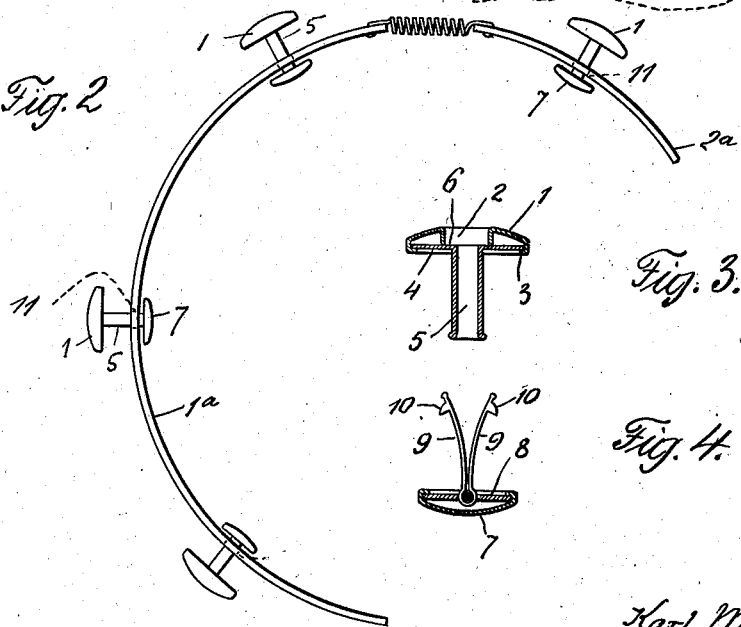
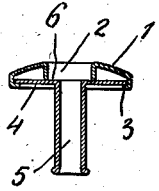
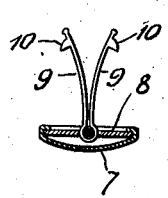
Inventor
Karl Mastele
Witnesses
A. H. Rabsag,

UNITED STATES PATENT OFFICE.

KARL MASTELE, OF PITTSBURG, PENNSYLVANIA.

BELT AND BELT-FASTENER.

No. 898,831.  Specification of Letters Patent.  Patented Sept. 29, 1908.

Application filed February 26, 1908. Serial No. 417,934.

*To all whom it may concern:*

Be it known that I, KARL MASTELE, a subject of the Emperor of Germany, residing at Pittsburg, in the county of Allegheny and State of Pennsylvania, have invented certain new and useful Improvements in Belts and Belt-Fasteners, of which the following is a specification, reference being had therein to the accompanying drawing.

This invention relates to a belt and belt fastener, particularly designed for supporting trousers worn by workmen.

The primary object of my invention is to provide a metallic resilient belt and novel fasteners for detachably securing the same to a pair of trousers.

Another object of this invention is to provide a simple, durable and inexpensive belt that will not interfere with the movements of a body surrounded by said belt.

With the above and other objects in view which will more readily appear as the invention is better understood, the same consists in the novel construction, combination and arrangement of parts to be presently described and then specifically pointed out in the appended claims.

In the drawings: Figure 1 is a perspective view of a belt constructed in accordance with my invention, Fig. 2 is a plan of a portion of the same, Fig. 3 is a longitudinal sectional view of the body of the belt fastener, and Fig. 4 is a similar view of the head of the belt fastener, partly in elevation.

In the accompanying drawings, 1ª and 2ª designate two semi-circular metallic straps or bands connected together by a plurality of coil springs 3ª, to form a belt for encircling the waistband of a pair of trousers 4ª, which I have illustrated fragmentary in Fig. 1 of the drawings. The belt can be arranged upon the outside of the trousers, but I preferably secure the same upon the inner side of the trousers, and connect said belt to the trousers by a plurality of fasteners or buttons.

Each fastener comprises a metallic body 1 having a central opening 2, and inwardly extending flanges 3. Supported within the body 1 by the flanges 3 is a disk 4 having a tubular shank 5, said disk 4 providing an annular shoulder 6 in the opening 2.

The head of the fastener comprises a cap 7 having a disk 8 fixed therein, said disk supporting resilient arms 9 provided with lugs 10.

When it is desired to place the head of the fastener in engagement with the body thereof, the resilient arms 9 are pressed together and inserted in the tubular shank. Immediately upon the lugs 10 passing therethrough, these lugs engage the annular shoulder 6 and prevent the head from being removed from the body of the fastener, until the resilient arms are retracted and withdrawn from the tubular shank.

The metallic semi-circular straps or bands 1 and 2 are provided with a plurality of openings 11 to receive the fasteners. The tubular shanks 5 of the fasteners are first forced through the fabric of the pair of trousers, then through the openings 11 and then the heads are placed in position to retain the fasteners in engagement with the belt and the pair of trousers.

It is thought that my invention will be fully understood from the foregoing description taken in connection with the drawings, and I reserve the right to make such structural changes as are permissible by the appended claims.

Having now described my invention what I claim as new, is:—

In a belt, the combination with a pair of trousers, of resiliently connected metallic straps, and fasteners for detachably securing said straps to said trousers.

In testimony whereof I affix my signature in the presence of two witnesses.

KARL MASTELE.

Witnesses:
A. H. RABSAO,
MAX H. SROLOVITZ.